(12) United States Patent
Harrison et al.

(10) Patent No.: US 8,882,441 B2
(45) Date of Patent: Nov. 11, 2014

(54) DEPLOYABLE WIND POWER AND BATTERY UNIT

(75) Inventors: Jane Harrison, Princeton, NJ (US); David Turnbull, Princeton, NJ (US); Doug King, Bath (GB)

(73) Assignee: ATOPIA Research, Princeton, NJ (US)

( * ) Notice: Subject to any disclaimer, the term of this patent is extended or adjusted under 35 U.S.C. 154(b) by 654 days.

(21) Appl. No.: 13/176,468

(22) Filed: Jul. 5, 2011

(65) Prior Publication Data

US 2012/0007365 A1 Jan. 12, 2012

Related U.S. Application Data

(60) Provisional application No. 61/362,216, filed on Jul. 7, 2010.

(51) Int. Cl.
*F03D 11/04* (2006.01)
*E03B 3/03* (2006.01)
*E04H 3/10* (2006.01)

(52) U.S. Cl.
CPC .. *E04H 3/10* (2013.01); *E03B 3/03* (2013.01); *Y10S 415/907* (2013.01)
USPC .............. 415/4.2; 415/4.4; 415/907; 416/142

(58) Field of Classification Search
CPC ............................... F03D 3/005; F03D 11/045
USPC ......... 415/4.1, 4.2, 4.4, 905, 907; 290/43, 44, 290/54, 55; 416/142
See application file for complete search history.

(56) References Cited

U.S. PATENT DOCUMENTS

| 4,032,439 | A | 6/1977 | Oldham |
| 5,064,308 | A | 11/1991 | Almond et al. |
| 5,848,856 | A | 12/1998 | Bohnhoff |
| 6,398,455 | B1 | 6/2002 | Volstad |
| 6,436,283 | B1 | 8/2002 | Duke |

(Continued)

FOREIGN PATENT DOCUMENTS

| WO | WO 2005/100786 A1 | 10/2005 | |
| WO | WO 2005100786 A1 * | 10/2005 | ................ F03D 9/00 |
| WO | WO 2010/037005 A2 | 4/2010 | |

OTHER PUBLICATIONS

Honeywell (HW7000EH—Jul. 2009).*

(Continued)

*Primary Examiner* — Edward Look
*Assistant Examiner* — Juan G Flores
(74) *Attorney, Agent, or Firm* — Crowell & Moring LLP (57) ABSTRACT

A portable, selectively deployable power supply and storage arrangement includes a frame, a floor securable to the frame and having a longitudinally extending guide member provided thereon, a mast assembly having a first end pivotally connected to a tractor element slidable along the guide member and a second end opposite the first end, and a wind turbine receivable at the second end of the mast assembly. A support is pivotally connected to and extends between both the frame and a portion of the mast assembly so that, upon displacement of the tractor element along the guide member, the support produces movement of the mast assembly between retracted and deployed positions. To facilitate transportation and relocation of the power supply and storage arrangement, the frame, the floor, the mast assembly, the wind turbine, and the support are configured to define a single unit and are collectively receivable in a shipping container.

16 Claims, 6 Drawing Sheets

(56) References Cited

U.S. PATENT DOCUMENTS

| | | | |
|---|---|---|---|
| 7,025,887 | B1 | 4/2006 | Kirts et al. |
| 7,491,330 | B2 | 2/2009 | Harvey |
| 2001/0030161 | A1 | 10/2001 | Hosoya |
| 2008/0073263 | A1 | 3/2008 | Yamaguchi |
| 2008/0169258 | A1 | 7/2008 | Weisbauer |
| 2008/0272064 | A1 | 11/2008 | Leonard |
| 2009/0128085 | A1 | 5/2009 | Yang |
| 2010/0140949 | A1* | 6/2010 | Pitre et al. .................. 290/55 |

OTHER PUBLICATIONS

Pitch_Africa: a project by ATOPIA Research, Sep. 2008, ATOPIA_Research Inc., Princeton, New Jersey. (Three (3) pages).
Pitch_Africa Log 2.1, Cistern_X, Jan.-Jun. 2009, ATOPIA_Research Inc., Princeton, New Jersey. (Four (4) pages).
"Catch the Rain so it Falls Forever", Pitch_Africa Log 2.2, Cisterns That Do Other Things, Jan.-Jun. 2009, ATOPIA_Research Inc., Princeton, New Jersey. (Six (6) pages).
Pitch_Africa Log 2.3, Street Soccer Venue, Jan.-Jun. 2009, ATOPIA_Research Inc., Princeton, New Jersey. (Seven (7) pages).
Pitch_Africa Log 3, 3.2 Special Containers, April-June, ATOPIA_Research Inc., Princeton, New Jersey. (Three (3) pages).
Pitch_Africa Log 3, 3.2 Furniture, April-June, ATOPIA_Research Inc., Princeton, New Jersey. (Five (5) pages).
Pitch_USA Log 1: a project by ATOPIA Research, Introduction, Oct. 2009, ATOPIA_Research Inc, Princeton, New Jersey. (Five (5) pages).
International Preliminary Report on Patentability (PCT/IB/326 & PCT/IB/373) dated Jan. 8, 2013 (two (2) pages).
Corresponding International Search Report with English Translation dated Dec. 13, 2011 ( two (2) pages).
Form PCT/ISA/237 (four (4) pages).
Princeton, "Wind Energy and Rainwater Harvesting Technologies for Post-Disaster Relief and Recovery", Princeton University, Apr. 2010, pp. 9-11, published at http://commons.princeton.edu/kellercenter/docs/Wind-Energy-Haiti-Project-2010.pdf.
Hilary Parker, "Researchers Develop Relief Technologies for Haiti", Princeton University Bulletin, May 24, 2010, p. 8, vol. 99, No. 14, published at http://www.princeton.edu/main/news/bulletin/docs/Bulletin-2010-05-24.pdf.
PCT/ISA/237 Form (Four (4) pages).
International Search Report dated Nov. 16, 2011 (Three (3) pages).
International Search Report dated Nov. 30, 2011 (eight (8) pages).
THES1ER, Kelly, "Target Field water recycling unique: Pentair system should reduce needs by 50 percent", MLB.com, Jan. 12, 2010 [online], [Retrieved on Nov. 16, 2011], Retrieved from the Internet: <http://minnesota.twins.mlb.com/news/article.jsp?ymd=20100112&content_id=7905456&vkey=news_min&fext=jsp&c_id=min>, (one (1) page).

* cited by examiner

DEPLOYABLE WIND POWER AND BATTERY UNIT

This application claims priority under 35 U.S.C. §119(e) to U.S. provisional application Ser. No. 61/362,216, filed Jul. 7, 2010, the entire disclosure of which is incorporated by this reference into the present application.

BACKGROUND OF THE INVENTION

1. Field of the Invention

The present invention generally relates to deployable wind turbine systems incorporating used and discarded shipping containers or similar elements.

2. Description of Related Art

Wind turbines are used for energy generation worldwide, and consist of a rotary engine in which the kinetic energy of a moving fluid is converted into mechanical energy by causing a bladed rotor to rotate. Some bladed rotors are oriented along a vertical axis (Vertical Axis Wind Turbines (VAWT)), and some are oriented along a horizontal axis (Horizontal Axis Wind Turbines (HAWT)). Some turbines are installed for use on a fixed site, and some are portable.

The ATOPIA RESEARCH Inc. document titled PITCH_AFRICA LOG 3, 3.2 SPECIAL CONTAINERS (April-June) describes various types of specially fitted out shipping containers that make possible the provision of services in areas without basic amenities.

SUMMARY OF THE INVENTION

One primary aspect of the invention concerns a portable, selectively deployable wind turbine including a bladed rotor attached to a pole or mast. The mast, which can be telescoping, and the bladed rotor can be stored within a container for shipping and erected for operation. The lower support mast is preferably attached to a guide rail or track that sits at the base of the container with a tractor element and hinge, provided by way of a ball or pin-joint, such that the base of the lower support mast can be moved along the track as the head of the mast, i.e. the upper support mast, is raised out of the container to its erect position. The upper mast is linked to the lower mast and can be extended either as the lower mast is being erected or after the lower mast has been erected. An A-frame support, a v-brace, a v-strut or "vang," or some other relatively rigid support element is attached to the storage container or a reinforcing frame received in the storage container and to the lower mast such that it assists in erecting the mast. Struts of the A-frame support are attached to the container or reinforcing frame and to the mast in such a way as to constrain the mast to move in an arc as the traction mechanism is operated to move the foot of the mast along the track.

Tsunamis, earthquakes, hurricanes, and other disasters often strike unexpectedly, yet the scale of the devastation inflicted during and in the wake of these events is not always random. Preparedness and disaster management plans can play a critical role in reducing human suffering and mortality caused by such disasters. While the nature of the required preparedness varies depending on the type of the disaster, the needs of the afflicted areas during post-disaster relief and recovery periods are often similar: shelter, energy for first aid and critical functions, clean water and food, and medical assistance.

The Haiti earthquake (2010) was a sad illustration of the shortfalls of post-disaster relief efforts related to the logistical challenges of organizing and transporting aid. One such shortfall addressed by the subject matter of the present invention is the lack of systems to reliably generate electricity for first aid and critical functions. Gas or diesel powered generators are usually used, but these items require a constant supply of fuel that can be difficult to ensure and expensive to deliver, since transportation routes are often in very poor conditions after a disaster. These generators, moreover, often compete for scarce fuel with essential transportation needs. Better alternatives are possible, and the hybrid wind power system forming the subject matter of this invention, built into a shipping container, can be rapidly deployed in disaster areas without the need for a significant fuel supply. It is contemplated that the version disclosed here should be able to generate around 5 kW of power; the maximum power could be higher if the arrangement is deployed in a windy area. The system would also have a storage capacity of several days.

Electricity production and storage would be sufficient to power a clinic, a small hospital, or a school. In the particular embodiment disclosed, a vertical axis turbine on a telescoping mast is utilized. Meteorological sensors can be embedded in the system to characterize wind and solar resources at the location and analyze and optimize the performance of the system. Such a power generation and storage unit will also promote sustainable practices in designing post-disaster engineered systems and will serve as a prototype for renewable energy development during a post-disaster rebuilding phase, allowing the local populations to become more familiar with these renewable technologies.

Wind turbines generate static and dynamic loads in the structure that have been analyzed and included in the design. The invention provides mechanisms utilized to deploy the wind turbine that are simple to allow easy erection with minimum human intervention and power, and permits all parts to retract back to fit inside the container, making deployment over different types of terrain possible.

According to one particularly preferred embodiment of the invention, the portable, selectively deployable power supply and storage arrangement includes a substantially rigid frame, a floor securable to the substantially rigid frame and having a longitudinally extending guide member provided thereon, a mast assembly having a first end pivotally connected to a tractor element slidable along the guide member and a second end opposite the first end, and a wind turbine receivable at the second end of the mast assembly. A support is pivotally connected to and extends between both the substantially rigid frame and a portion of the mast assembly so that, upon displacement of the tractor element along the guide member, the support produces movement of the mast assembly between retracted and deployed positions. Batteries or other energy storage elements, which may be supported by the frame, can be included in the assembly to store energy provided by output current produced during operation of the wind turbine. In order to facilitate transportation and relocation of the power supply and storage arrangement in an advantageous manner, the substantially rigid frame, the floor, the mast assembly, the wind turbine, and the support are configured so as to define a single unit and are collectively receivable as that unit in a shipping container.

Multiple height adjustable outrigger arrangements preferably are attachable to the shipping container to stabilize the arrangement when the arrangement is in use and, at the same time, receivable within the container during transportation of the arrangement when the arrangement is not in use.

The mast assembly is most preferably telescopic, with an upper support mast defining the second end retractable into a lower support mast defining the first end for reception in the shipping container. A display facilitating identification of the arrangement, by power output rating or otherwise, may be disposed on the shipping container.

A process of relocating a selectively deployable power supply and storage arrangement is also described.

DETAILED DESCRIPTION OF THE INVENTION

Figure 1:
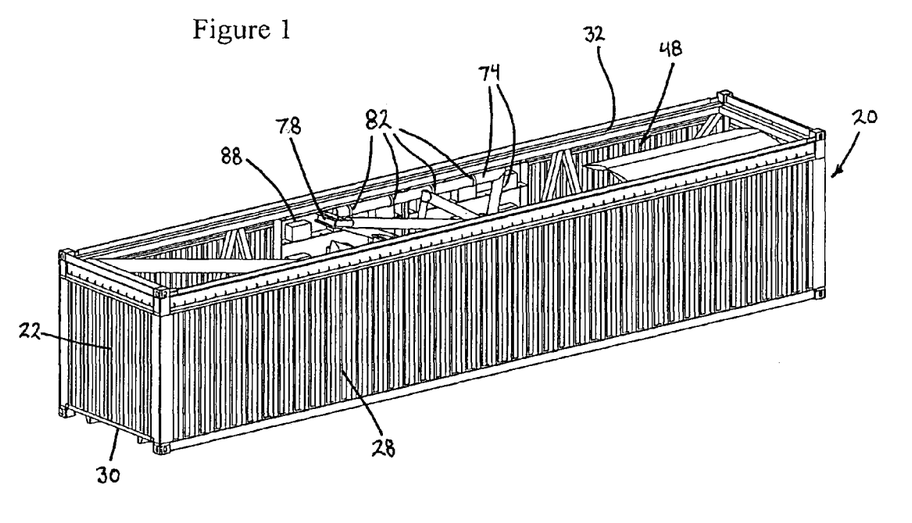
FIG. 1 shows a collection of elements according to the invention received, in a packed condition, within a standard, readily available shipping container.
Figure 6:
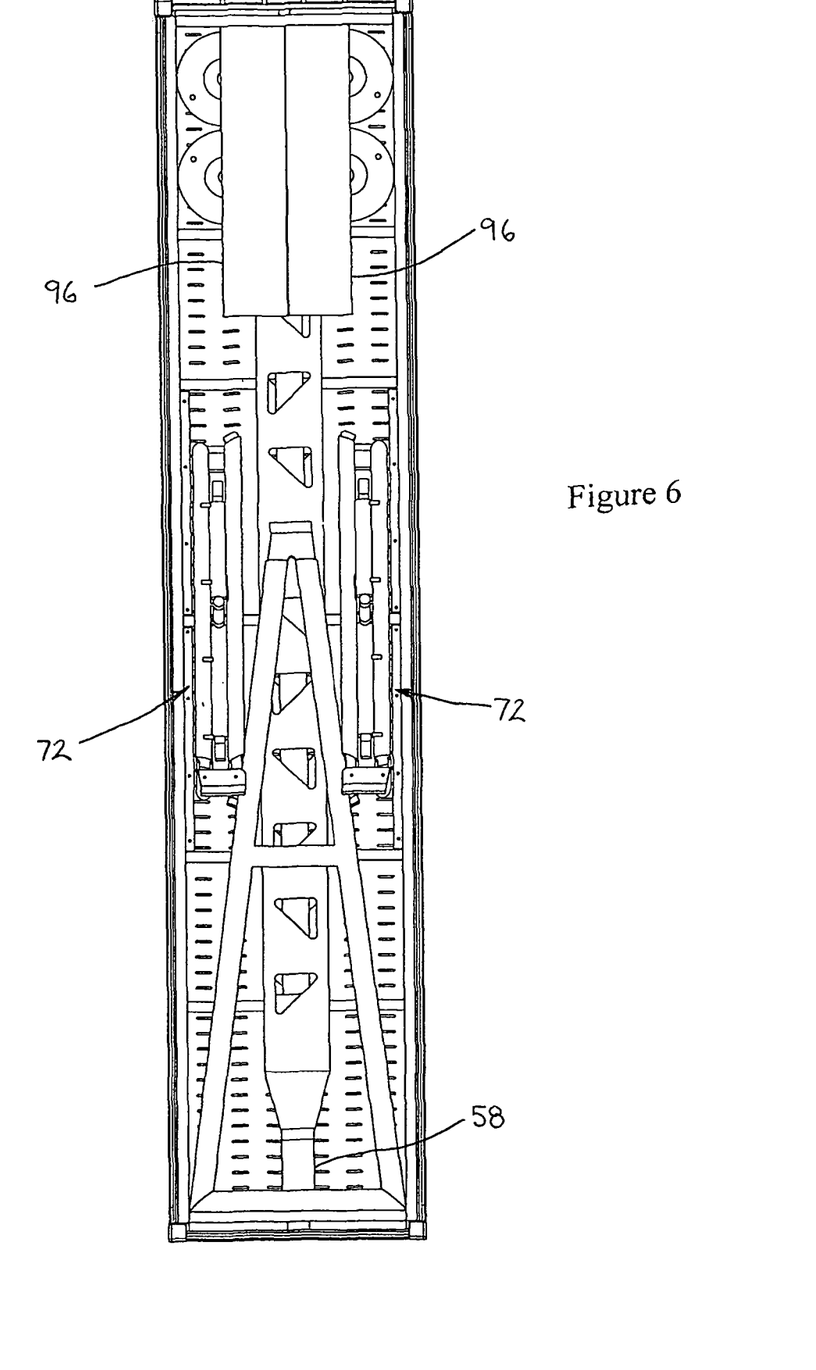
FIG. 6 is a view illustrating positions occupied by elements shown in FIG. 5 when those elements are in a packaged condition.

The isometric view provided by FIG. 1 shows a collection 48 of elements received, in a packed condition, within a standard, readily available 40' ISO (International Organization for Standardization) shipping container 20. The packaged collection 48 of elements is utilized in a manner to be described to place a vertical axis turbine 50 (FIG. 3) into operational condition. The container 20 is entirely conventional, and, as illustrated in FIGS. 1 and 6, includes a pair of end walls 22, 24, a pair of side walls 26, 28, a floor 30, and an open top 32.

Figure 2:
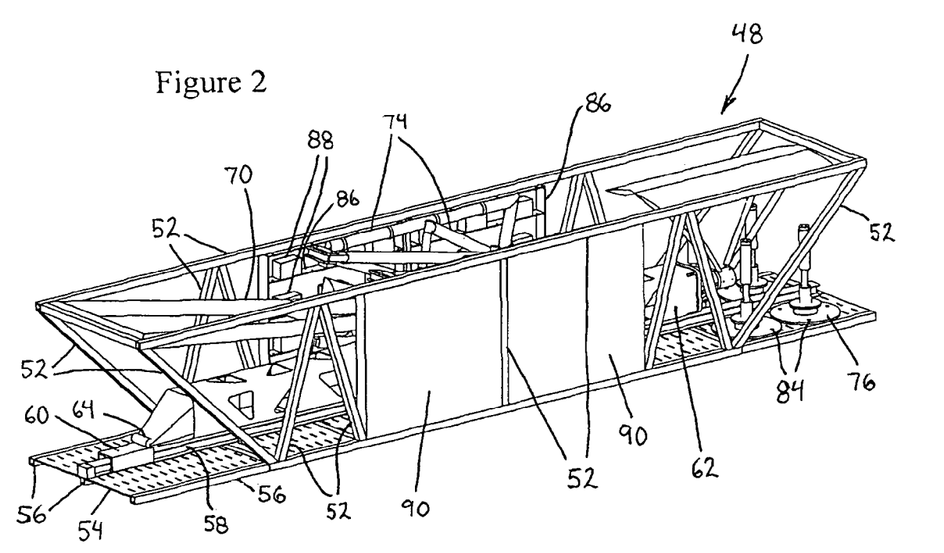
FIG. 2 illustrates the collection of elements shown in FIG. 1 but without the shipping container.

FIG. 2 illustrates the collection 48 of elements without the shipping container 20. This collection 48 has numerous individual components, including a steel reinforcing frame 52, a perforated sheet steel floor 54, floor reinforcing and support rails 56, producing a raised floor level within the container 20 providing space for cabling and other services, a tractor element guide member, such as a guide rail 58, secured to the floor 54, a tractor element 60 slidable along the guide rail 58, and a mast assembly, having a lower turbine support mast 62 interconnected by a hinge 64 to the tractor element 60 and a tubular element 66 defining an upper support mast that telescopes into and out of the lower turbine support mast 62. The telescoping mast can use hydraulics or a manual or motor driven pulley system. Openings 68 may be included in the lower support mast 62 for weight reduction and/or servicing purposes.

Figure 3:
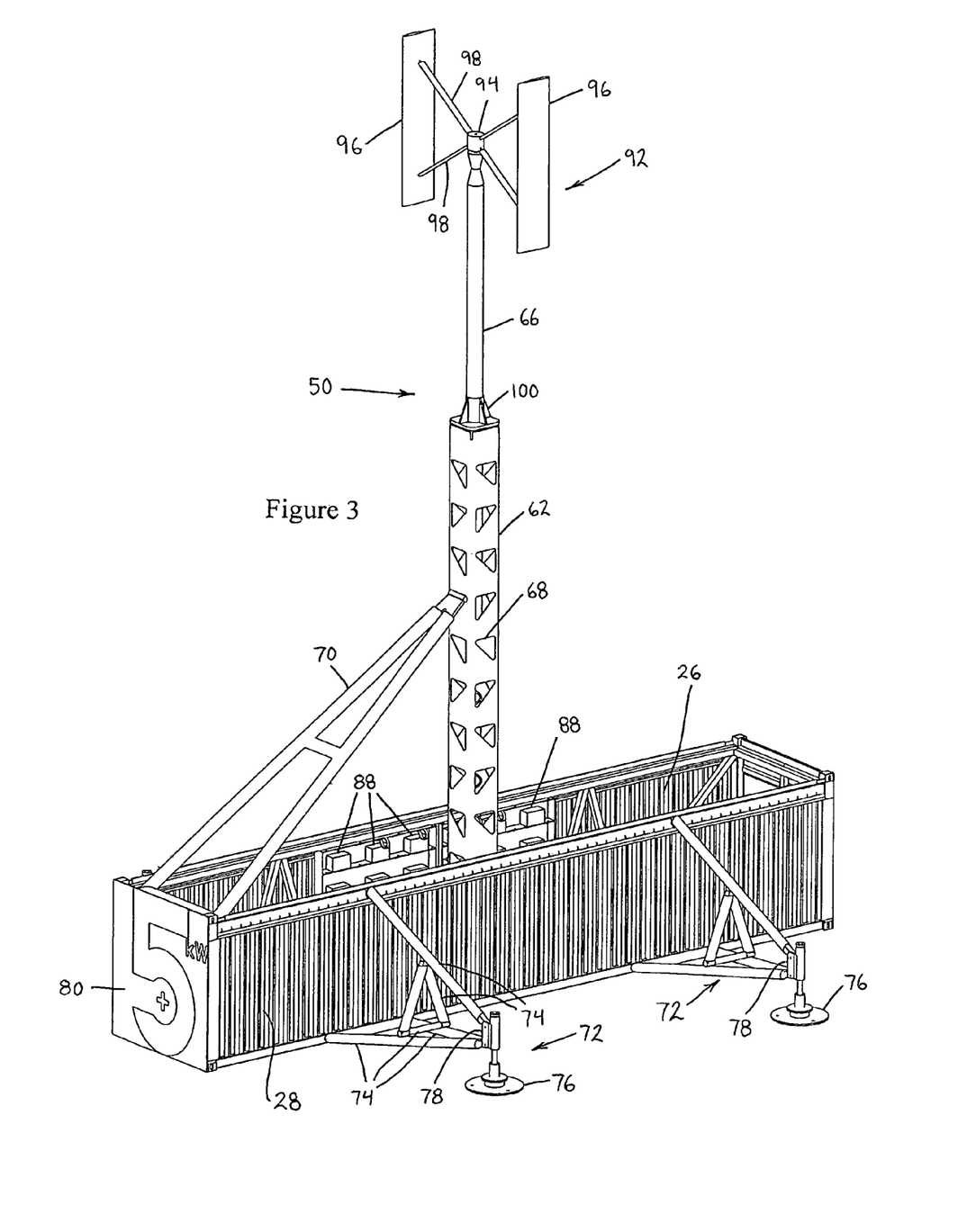
FIG. 3 shows elements of the overall arrangement when the mast assembly of the invention has been placed into its substantially vertical, erect position.

The legs of a rigid A-frame support or "vang" 70 are illustrated in FIG. 3 as pivotally connected, by hinges or otherwise, to both the steel reinforcing frame 52 and to an appropriate portion of the lower support mast 62. During displacement of the tractor element 60 to the right from its left end position on the guide rail 58 shown in FIG. 2, the A-frame support 70 forces the lower support mast 62 to pivot about the hinge 64 from the substantially horizontal, packaged position shown in FIG. 2 to the substantially vertical, erect position shown in FIG. 3. An appropriate stop 112 (FIG. 5) on or adjacent to the guide rail 58 could be used to preclude movement of the tractor element 60 beyond its preferred position on the guide rail when the lower support mast 62 is in the erect position. Upon displacement of the tractor element 60 back to the left, of course, the A-frame support 70 forces the lower support mast 62 from the position it occupies in FIG. 3 back into the substantially horizontal, packaged position shown in FIG. 2. Movement of the tractor element 60 along the guide rail 58 may be produced in any appropriate manner, such as a manually operated or motorized screw drive (not shown).

Multiple outrigger arrangements 72, illustrated by way of example in FIG. 3, are used to stabilize the container 20 in position whenever the turbine arrangement received in the container 20 is in use. Each of these outrigger arrangements includes a plurality of solid or tubular support members 74 interconnected in such a way as to define frames that secure height adjustable feet 76 to the opposite side walls 26 and 28 of the container 20. Bolts (not shown) extending through holes (not shown) formed in the container walls 26 and 28 may be used to removably secure ends of some of the support members 74 to the side walls 26 and 28, while brackets 78 are used to interconnect the height adjustable feet 76 to outer ends of the outrigger arrangements 72. FIG. 3 also shows an ornamental display 80 that could be used to facilitate identification of the overall collection 48 of elements by power output rating or in some other way.

When the outrigger arrangements 72 and other elements of the collection 48 of elements are stored in the packed condition shown in FIG. 1, bands or straps 82 may be used to secure the support members 74 in position within the shipping container 20. Bolts 84 or other fasteners may be passed through the perforations in the floor 54 to secure the feet 76 in place in the packed condition.

Shelving 86 is visible in each of FIGS. 1-3. This shelving 86 is mounted on panels 90 welded or otherwise secured to the reinforcing frame 52, and may be used, for example, to receive a pair of opposed arrays of energy storage elements, such as batteries 88, utilized to selectively supply power as needed and to store energy produced by the wind turbine in a manner to be described. The shelving can be configured to protect the batteries from exposure to rain. Additional power generating systems such as solar panels could be attached to the structure to harvest additional power or run equipment.

In the particular arrangement illustrated in the drawing figures, a VAWT 92, including two blades 96 interconnected to a drive element 94 by diagonal spars 98, is disposed at a distal end of the tubular element 66 defining the upper support mast. The drive element 94 is rotatable relative to the tubular element 66 due to the action of wind on the blades 96. When the wind turbine 92 is to be used, the blades 96 are mounted in or moved into their operational positions, shown in FIG. 3, and locked into place. FIGS. 1 and 2 show the positions of the blades 96 in the packed condition. Other wind turbine configurations could be used if desired, although any turbine used would need to be properly storable whenever the overall collection 48 of elements is placed into the packed condition. Any such turbine could either be adjusted and designed to fit in the container, folded or hinged such that it can fit into the available space of the container, or partially dismantled to fit into the available space.

Figure 4:
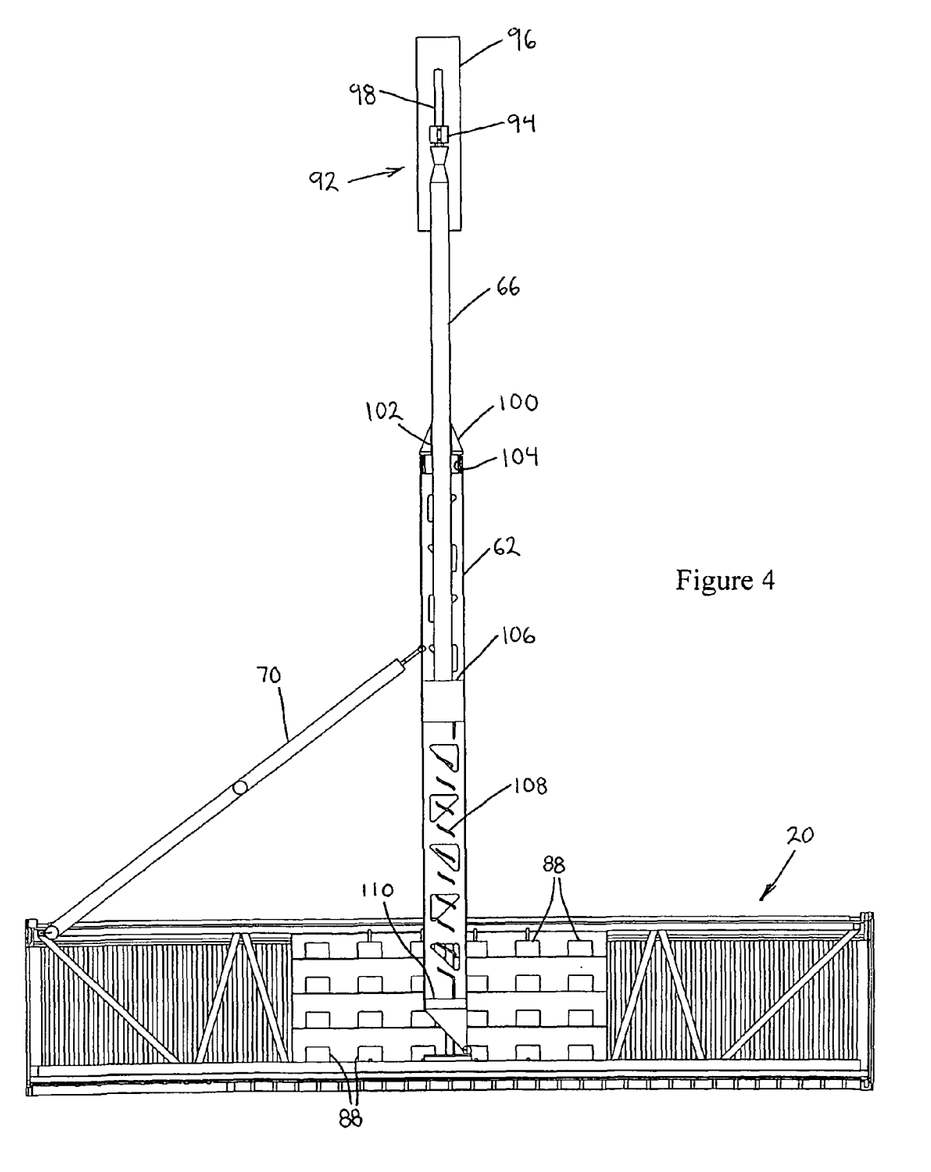
FIG. 4 is a lateral view of the overall arrangement showing the mast assembly in the substantially vertical, erect position but with portions of the mast and the container cut away.

FIG. 4 is a lateral view of the overall arrangement showing the lower support mast 62 in the substantially vertical, erect position of FIG. 3 but with portions of the mast 62 and the container 20 cut away. While outrigger arrangements 72 are not shown in FIG. 4 for simplicity, the VAWT 92 as shown is in its deployed position, and the tubular element 66 defining the upper support mast, the A-frame support 70, the drive element 94, one of the two blades 96, and one of the diagonal spars 98 are identified. FIG. 4 shows a sleeve 102 with reinforcing ribs 100 secured by way of a collar 104 to the distal end of the lower support mast 62. The sleeve 102 operates as a guide for the upper support mast as it moves between its extended and retracted positions. The rotor of a conventional electromagnetic generator 106, mounted at the lower end or the element 66, is interconnected by a drive shaft (not shown) to the drive element 94 so that the rotor spins as a result of wind forces acting on the blades 96. Output current from the generator 106 is passed by a cable 108 (shown partially cut away) to an inverter 110, and then supplied by cable connections (not shown) to respective batteries 88 for storage.

Figure 5:
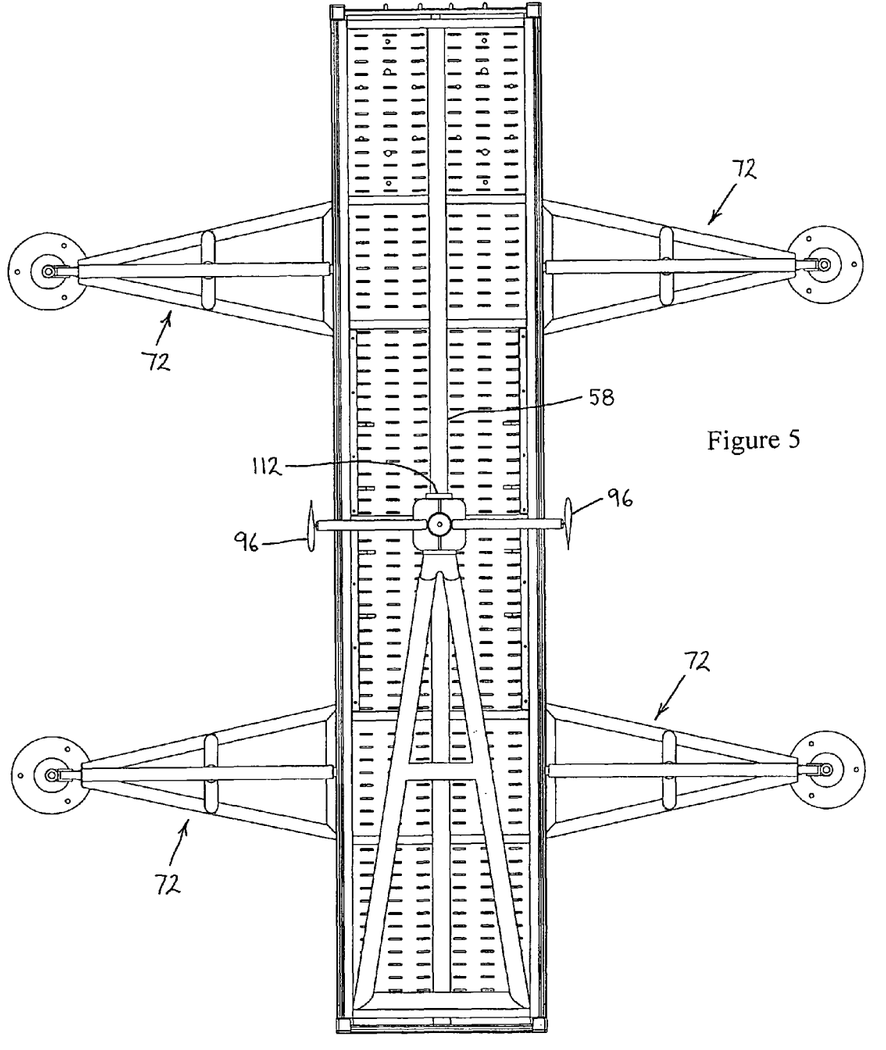
FIG. 5 shows various elements of the arrangement as they appear when the wind turbine utilized is deployed for use.

FIG. 5 shows various elements of the arrangement as they appear when the VAWT 92 is deployed for use. In addition to the stop 112 and the guide rail 58 mentioned previously, outrigger arrangements 72 and blades 96 are identified in FIG. 5. These same elements are identified in FIG. 6, which illustrates positions taken by the same elements in the packaged condition.

The container used for the erectable mast and turbine can be of any scale; for example, a large 40' shipping container or a smaller, 20' shipping container could be utilized. The container serves to provide structure, ballast, and foundation for the wind turbine while in operation, as well as permitting storage for structural attachments necessary to stabilize the mast and turbine when they are erected or in operation. The container operates as a storage container and housing for all electrical and mechanical components needed to operate the system including, for example, batteries for energy storage, generators, inverters, and alternators, and as protection during transport and storage. The deployable wind turbine arrangement thus acts as a mobile battery power unit that can be stored in ports or other types of sites and delivered to areas that need an emergency power supply or independent power source. Many shipping containers are dumped in places of the world or are underutilized in ports, and these containers could be converted for additional use in regions where there is a need for power. There is a need, as well, for demonstrating sustainable power generation technologies, such as small wind, to communities in the world to facilitate the spread of knowledge about such technologies as long-term systems for providing energy.

The upper and lower mast sections are typically made from hollow steel or aluminum sections or trusses, but bamboo or composites, such as carbon fiber or fiberglass, could be used as well. The electrical and mechanical components necessary for the turbine to function can be installed within the lower mast or the upper mast, or outside of those masts in the base of the container or at the top of the mast adjacent to the wind turbine.

The tractor element 60 slidable along the guide rail 58 may be operated manually or electronically with a motor. This tractor element can attach to the guide rail or track using a system of pulleys, rollers, wheels or other types of bearings conducive to the loads and motion.

The bank of batteries stored in the container stores power which can be received and delivered as either AC or DC. These batteries 88 can be pre-charged prior to the wind turbine system being deployed and can be topped up as if power is used by the wind turbine. Alternatively, the batteries can operate as a storage mechanism for surplus energy. The batteries also act as structural ballast at the base and sides of the container to contribute to its stability when operating.

A range of systems could be used for distributing the power produced by the turbine. The turbine can be used to distribute power directly at its location for running equipment such as tools, refrigeration of medicines, and the charging batteries, or it can be used to distribute power remotely by attaching transmitting cables from the central unit to remote locations. A power system has thus been developed that addresses power needs emergency situations such as those following environmental or other crises, and can supply power to assist in aid operations.

The invention is particularly suitable for use as a portable, off-grid power supply arrangement utilizing wind power, as it incorporates a deployable mast and an integrated electrical power storage system. The invention is thus particularly suitable for rapid post-disaster deployment.

While one particular form of the invention has been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

The invention claimed is:

1. A portable, selectively deployable power supply and storage arrangement, comprising:
   a substantially rigid frame,
   a perforated floor securable to the substantially rigid frame and including a longitudinally extending guide member secured to an upper side of the perforated floor,
   a mast assembly having a first end pivotally connected to a tractor element slidable along the guide member, and a second end opposite the first end,
   a wind turbine receivable at the second end of the mast assembly,
   a support pivotally connected to and extending between both the substantially rigid frame and a portion of the mast assembly so that, upon displacement of the tractor element along the guide member, the support produces movement of the mast assembly between retracted and deployed positions,
   storage elements for storing energy provided by output current produced during operation of the wind turbine, and
   multiple outrigger arrangements to stabilize the deployable power supply and storage arrangement when the power supply and storage arrangement is in use,
   wherein the substantially rigid frame, the floor, the mast assembly, the wind turbine, and the support define a single unit and are collectively receivable as that unit in a shipping container to facilitate transportation and relocation of the power supply and storage arrangement, and
   wherein perforations in the perforated floor provide for access by fastening elements to the outrigger arrangements to secure the outrigger arrangements against the upper side of the perforated floor during said transportation and relocation.

2. The arrangement of claim 1, wherein the multiple outrigger arrangements are attachable to the shipping container when the arrangement is in use.

3. The arrangement of claim 2, wherein the outrigger arrangements are height adjustable.

4. The arrangement of claim 1, wherein the storage elements are batteries supported by way of the substantially rigid frame.

5. The arrangement of claim 1, wherein the mast assembly is telescopic.

6. The arrangement of claim 1, wherein the mast assembly includes a lower support mast defining said first end and an upper support mast defining said second end.

7. The arrangement of claim 6, wherein said upper support mast is retractable into said lower support mast for reception in said shipping container.

8. The arrangement of claim 6, wherein the lower support mast and the upper support mast are telescopic.

9. The arrangement of claim 1, further comprising a display facilitating identification of the arrangement disposed on the shipping container.

10. The arrangement of claim 9, wherein the display provides said identification by way of power output rating.

11. The arrangement of claim 1, wherein each of the outrigger arrangements includes support members securable to side walls of the shipping container and a height adjustable foot interconnected to the support members, and wherein the fastening elements are bands or straps that secure the support members in position on the upper side of the perforated floor.

12. The arrangement of claim 11, wherein the fastening elements further include at least one bolt that secures the height adjustable foot in position on the upper side of the perforated floor.

13. The arrangement of claim 1, wherein the frame includes panels welded to lateral sides thereof, and shelving mounted on the panels.

14. The arrangement of claim 1, wherein the wind turbine is a vertical axis wind turbine.

15. The arrangement of claim 1, further comprising an inverter disposed adjacent the first end of the mast to receive current produced during operation of the wind turbine.

16. The arrangement of claim 1, wherein the tractor element extends at least partly around an outer circumference of the guide member.

* * * * *